United States Patent [19]

Saglio

[11] 4,201,971
[45] May 6, 1980

[54] ULTRASONIC CENTERING APPARATUS
[75] Inventor: Robert Saglio, Antony, France
[73] Assignee: Commissariat a l'Energie Atomique, Paris, France
[21] Appl. No.: 896,306
[22] Filed: Apr. 14, 1978
[30] Foreign Application Priority Data
May 31, 1977 [FR] France .................. 77 16500
[51] Int. Cl.² .......................................... G01B 17/00
[52] U.S. Cl. .................................................. 367/95
[58] Field of Search ............................ 340/1 R, 8 FT
[56] References Cited
U.S. PATENT DOCUMENTS

| | | | |
|---|---|---|---|
| 3,021,706 | 2/1962 | Cook et al. | 340/1 R X |
| 3,028,752 | 4/1962 | Bacon | 340/8 FT X |
| 3,140,612 | 7/1964 | Houghton | 340/1 R X |
| 3,237,150 | 2/1966 | Beck et al. | 340/1 R |

Primary Examiner—T. H. Tubbesing
Attorney, Agent, or Firm—Pearne, Gordon, Sessions

[57] ABSTRACT

An ultrasonic centering apparatus, wherein it comprises at least one ultrasonic transducer placed within an enclosure, said transducer transmitting at least one ultrasonic wave, means for collecting the different ultrasonic echos from the walls of said enclosure, means for measuring the time gap separating the reception of the different echos and means for displacing the transducer or transducers until the different echos are received at the same time by said echo receiving means.

A particular application of the invention is to the centering of inspection equipment in the tubes of nuclear reactor vessels.

4 Claims, 6 Drawing Figures

ULTRASONIC CENTERING APPARATUS

BACKGROUND OF THE INVENTION

The present invention relates to an ultrasonic centering apparatus.

It is known that remote interventions in radioactive or chemical media having a hostile nature are often indispensable for inspection or manipulation purposes. It may also prove advantageous to place a testing instrument in an enclosure having an axis of symmetry. This is particularly the case when it is necessary to inspect irradiated vessels of nuclear power stations or submerged parts by means of ultrasonics. Due to coupling with the fluid ultrasonics propagate easily in submerged parts.

It is particularly useful to use systems where it is not necessary to centre by means of a mechanical contact, because the latter makes it necessary to use mechanical return means and a relatively unreliable and always expensive linkage, whilst often bringing about contamination by contact.

BRIEF SUMMARY OF THE INVENTION

The ultrasonic centering apparatus according to the invention comprises at least one ultrasonic transducer placed within the enclosure where said transducer is to be centred. The transmitter transmits at least one ultrasonic wave. The apparatus comprises means for collecting the various ultrasonic echos from the walls of the enclosure, means for measuring the time gap separating the reception of the different echos and means for displacing the transducer or transducers acting until the various echos have been received at the same time by said echo receiving means.

According to a preferred embodiment of the invention a single ultrasonic transducer in the form of a transmitter or receiver is used which faces either a dihedron whose faces form an angle of 45° with the transmitter—receiver face of the transducer, so that the beam emitted by the transducer is subdivided into two parts, or a pyramid with a square base whose faces always form an angle of 45° with the emitting-receiving face of the transducer (pyramid with an apex angle of 90°), so that the beam is subdivided into four parts.

The principle of the present apparatus is as follows. When all the echos transmitted by the various walls reach the transducer at the same time, which is an easily observable phenomenon, the apparatus is perfectly centred.

BRIEF DESCRIPTION OF THE DRAWINGS

Other features and advantages of the invention can be gathered from the following description of non-limitative embodiments and with reference to the attached drawings, wherein show.

DETAILED DESCRIPTION OF THE PREFERRED EMBODIMENTS

Figure 1:
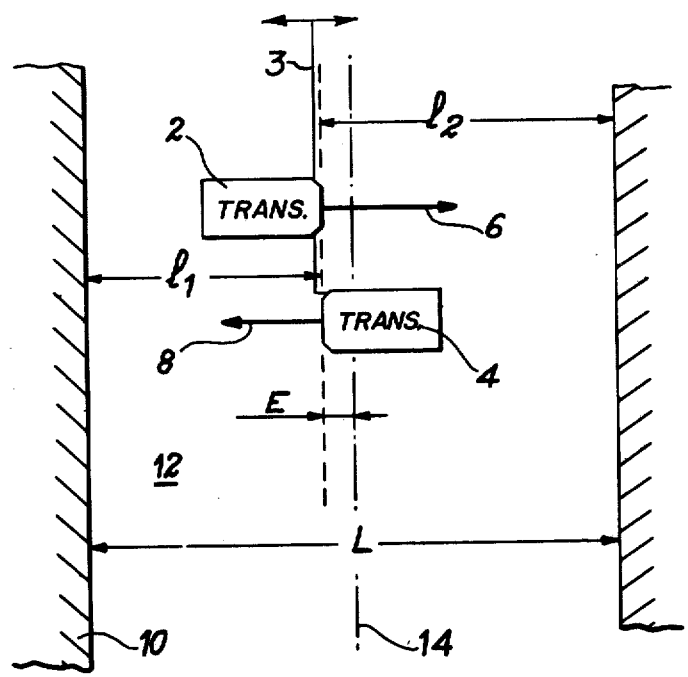
FIG. 1 a diagram of the centering apparatus having two transducers.

FIG. 1 shows a centering apparatus according to the invention with two ultrasonic transducers located between two planar, parallel walls, spaced by the distance L. The two transducers 2 and 4 are joined by a displaceable mechanical frame 3 and are simultaneously electrically excited so as to transmit two ultrasonic beams in directions indicated by the arrows 6 and 8. Beam 8 twice traverses the distance $l_1$, being reflected by wall 10 in such a way that if V is the speed of sound in the coupling medium, for example the water filling space 12 between the two walls the equation:

$$l_1 = V \times \frac{t_1}{2}$$

is obtained in which $t_1$ is the time taken by the ultrasonics to perform a return movement between transducer 4 and the wall.

The distance E is that between the transmitting-receiving faces of transducers 2 and 4 and the axis of symmetry 14. The aim is to minimise this distance.

Figure 2:
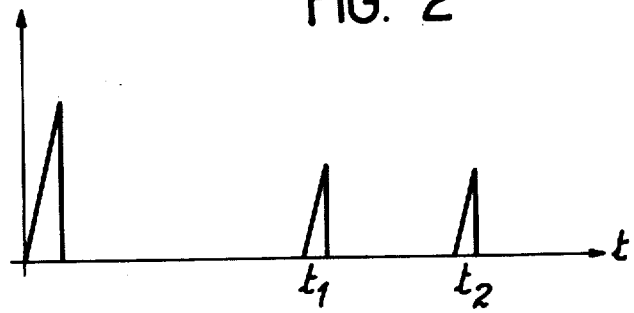
FIG. 2 the echos received by the various transducers corresponding to a single pulse for a system of off-centre transducers.

FIG. 2 shows the amplitudes of the peaks transmitted and received by the receivers as a function of the time T, the echos appearing at times $t_1$ and $t_2$ and corresponding to the different reflections of the initial pulse returned at time zero by the two transducers. The following relations can be written:

$$l_1 = V \frac{t_1}{2}$$
$$l_2 = V \frac{t_2}{2}$$
$$L = l_1 + l_2 = \frac{V}{2}(t_1 + t_2)$$
$$E = l_1 - \frac{L}{2} = \frac{V}{2} \times t_2 - \frac{V}{4} t_1 - \frac{V}{4} t_2$$
$$E = \frac{V}{4}(t_2 - t_1)$$

Figure 3:
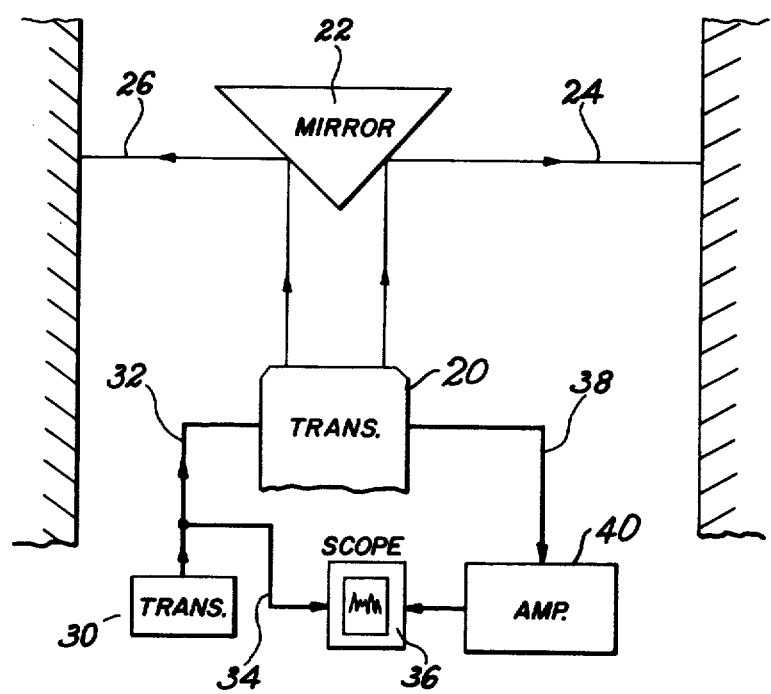
FIG. 3 a single reflector-type transmitter system permitting the centering of one member.

FIG. 3 shows an apparatus which illustrates another embodiment of the invention where there is a single transmitting-receiving transducer 20 which transmits a beam which is separated into two parts by a dihedral mirror 22 and specifically into channels 24 and 26 running in parallel at opposite directions. The exciting member of transducer 30 transmits into channel 32 the order to emit a pulse from 20 and another pulse by channel 34 which starts off for example an oscilloscope 36 to which are fed via channels 38 and amplifier 40 the echos received by the transducer in the receiving phase.

The apparatus may be applied directly to the centering of transducers in a tube having an annular or polygonal cross-section. It is merely necessary to perform the same measurement in planes at 90° to one another, whereby information is obtained on the variations between two orthogonal directions, which enables the axis to be defined.

Figure 4:
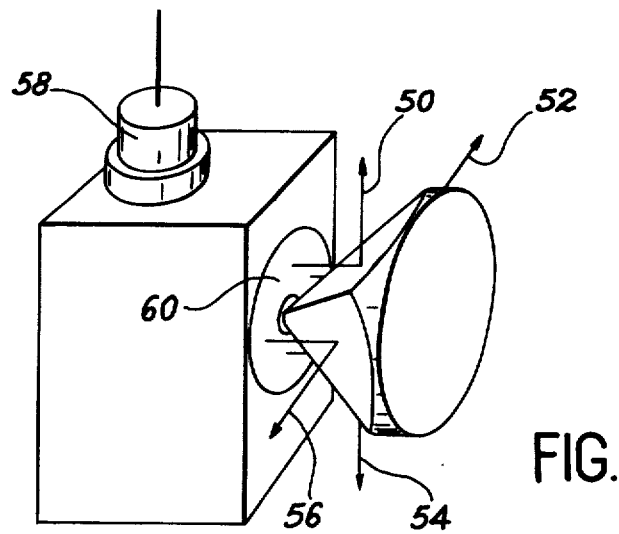
FIG. 4 a centering apparatus according to the invention associated with a pyramidal deflector with four faces.

To this end and as shown in FIG. 4 four mirrors inclined by 45° are positioned in front of the transducer. These mirrors define the faces of a pyramid with a square base, whose truncated or non-truncated apex is in contact with the transmitting face of the transducer.

FIG. 4 shows an apparatus of this type which transmits four beams 50, 52, 54 and 56. The electrical power supply for the system is provided by the coaxial connection 58 connected to a piezoelectric transmitter 60. The transducer clearly operates as a transceiver.

Figure 5:
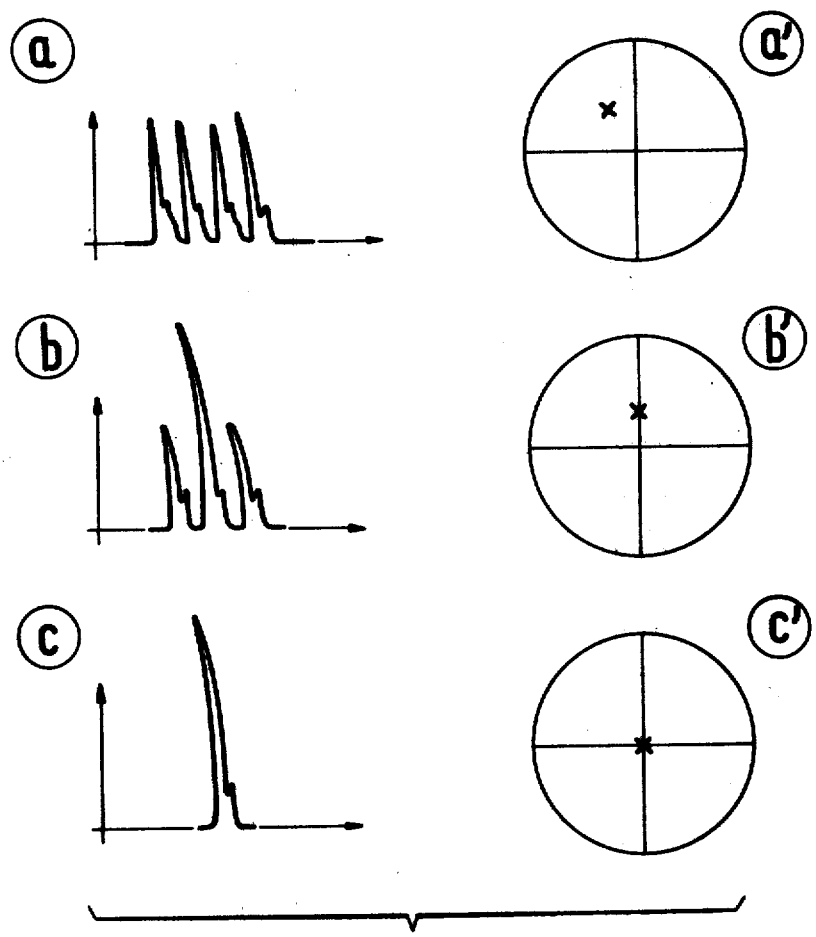
FIG. 5 the various echos received by the transducer used in FIG. 4 for different centering positions.

In FIGS. 5a', 5b' and 5c' of FIG. 5 are shown the positions, indicated by a cross, of the transducer and in FIGS. 5a, 5b and 5c the corresponding echos received by the transducer functioning as a receiver. For a completely off-centre position relative to a tube, i.e. position 5a', four echos corresponding to four reflections are received which arrive at the transducer at different times. When the centering apparatus is centred relative to an axis as in position 5b' only three echos are received, the central signal having double the amplitude of the two other signals, so that two echos merge. Finally when the transducer is centred as at position 5c' there is only a single echo. This makes it possible to provide an automatic centering apparatus by scanning round the maximum amplitude position.

Figure 6:
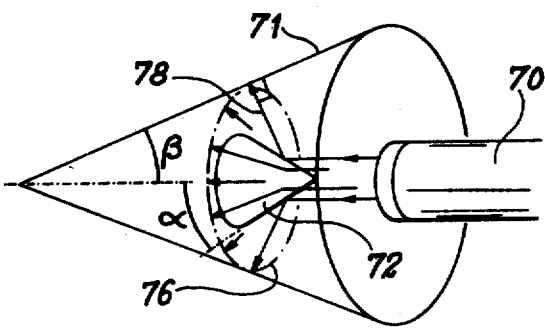
FIG. 6 an apparatus according to the invention comprising a conical reflector.

FIG. 6 shows a transmitter 70 facing a cone 72, whereby the angle of this cone $\alpha$ is connected to the angle $\beta$ of cone 71 where it is desired to centre the transmitter by the relation $2\alpha + \beta = \pi/2$. Transmitter 70 transmits a multi-ray, radially extending beam 76, whose rays 78 are perpendicular to the walls of cone 71. Obviously the same apparatus can be used for centering an object within a sphere.

This contactless apparatus operates in a satisfactory manner and permits measurements to within a fraction of a millimeter. Its simplicity is of great interest and numerous applications can be envisaged, particularly the centering of inspection equipment in the tubes of reactor vessels. These apparatus can themselves be ultrasonic inspection devices.

In the present embodiment the means for displacing the transducer or transducers have not been shown because they are well known to the Expert.

The invention is not limited to the embodiments described and represented hereinbefore and various modifications can be made thereto without passing beyond the scope of the invention.

What is claimed is:

1. An ultrasonic centering apparatus, wherein it comprises at least one ultrasonic transducer placed within an enclosure, said transducer transmitting at least one ultrasonic wave, means for collecting the different ultrasonic echos from the walls of said enclosure, means for measuring the time gap separating the reception of the different echos and means for displacing the transducer or transducers until the different echos are received at the same time by said echo receiving means.

2. An apparatus according to claim 1, wherein it comprises a single ultrasonic transmitting-receiving transducer which faces the apex of a dihedron whose faces form an angle of 45° with the transmitting-receiving face of the transducer.

3. An apparatus according to claim 1, wherein it comprises a single ultrasonic transmitting-receiving transducer facing the apex of a pyramid, whose faces form an angle of 45° with the transmitting-receiving face of the transducer.

4. An apparatus according to claim 1, wherein it comprises a single ultrasonic transmitting-receiving transducer facing the apex of a cone, whose apex angle is 90° and whose generating lines form an angle of 45° with the transmitting-receiving face of the transducer.

* * * * *